United States Patent
Matus et al.

(10) Patent No.: US 6,992,262 B2
(45) Date of Patent: Jan. 31, 2006

(54) METHOD AND APPARATUS FOR LOCALIZED CONTROL OF A PLASMA CUTTER

(75) Inventors: Tim A. Matus, San Antonio, TX (US); David Lambert, Larsen, WI (US); Joseph C. Schneider, Menasha, WI (US); James F. Ulrich, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/605,568

(22) Filed: Oct. 9, 2003

(65) Prior Publication Data

US 2005/0077273 A1    Apr. 14, 2005

(51) Int. Cl.
    *B23K 9/00*    (2006.01)
(52) U.S. Cl. .......................... 219/121.39; 219/121.48; 219/121.54
(58) Field of Classification Search ........... 219/121.11, 219/121.36, 121.39, 121.4, 121.41, 121.42, 219/121.43, 121.44, 121.54, 121.56, 121.57
    See application file for complete search history.

(56) References Cited

U.S. PATENT DOCUMENTS

| | | | |
|---|---|---|---|
| 5,831,237 A * | 11/1998 | Daniel .................. | 219/121.54 |
| 5,866,869 A | 2/1999 | Schneider et al. | |
| 5,989,485 A | 11/1999 | Staacks et al. | |
| 6,326,581 B1 | 12/2001 | Lamier et al. | |
| 6,359,251 B1 * | 3/2002 | Picard et al. .......... | 219/121.57 |
| 6,365,868 B1 * | 4/2002 | Borowy et al. ........ | 219/121.54 |
| 6,369,350 B1 | 4/2002 | Norris | |
| 6,570,132 B1 | 5/2003 | Brunner et al. | |
| 6,700,091 B2 | 3/2004 | Jones et al. | |
| 6,781,085 B2 * | 8/2004 | Ulrich et al. .......... | 219/121.39 |
| 6,794,601 B2 * | 9/2004 | Norris et al. .......... | 219/121.57 |
| 2003/0160031 A1 | 8/2003 | Jones et al. | |

FOREIGN PATENT DOCUMENTS

| | | |
|---|---|---|
| GB | 1 225 907 A | 3/1971 |
| JP | 2002331383 A | 11/2002 |

OTHER PUBLICATIONS

Hackl, Heinrich, Digitally Controlled GMA Power Sources, pp. 1-7 http://www.fronius.com/worldwide/usa/products/paper_digitally_controlled_power_sources_gb.pdf.

* cited by examiner

*Primary Examiner*—Tu Hoang
(74) *Attorney, Agent, or Firm*—Ziolkowski Patent Solutions Group, SC

(57) ABSTRACT

The present invention is directed to a system and method for a plasma cutting system including a plasma cutting power source and a plasma torch operationally connected to the plasma cutting power source. A processing unit is disposed within the plasma torch and is configured to control the plasma cutting power source during a plasma cutting process based on operational feedback gathered of the plasma cutting process.

22 Claims, 3 Drawing Sheets

METHOD AND APPARATUS FOR LOCALIZED CONTROL OF A PLASMA CUTTER

BACKGROUND OF INVENTION

The present invention relates generally to plasma cutting systems and, more particularly, to a method and apparatus for localized feedback and control systems. Specifically, the present invention provides a system and method of controlling a plasma cutting process by localizing feedback sensors and a processing unit within a plasma-cutting torch.

Plasma cutting is a process in which an electric arc is used to cut a workpiece. Plasma cutters typically include a power source, an air supply, and a torch. The torch or plasma torch is used to create and maintain the arc and plasma that perform the cutting. The plasma cutting power source receives an input voltage from a transmission power line or generator and provides an output voltage to a pair of output terminals, one of which is connected to an electrode and the other of which is connected to the workpiece.

The air supply is used with most plasma cutters to help start the arc, provide the plasma cutting gas to the torch, and cool the torch. A movable or fixed electrode serves as a cathode and a fixed nozzle serves as an anode. The air supply moves the electrode and as the electrode moves away from the nozzle, it opens the nozzle, and a plasma jet is created. The plasma jet causes the arc to transfer to the work piece, and thus initiates the cutting process. In other plasma cutting systems, a high frequency starter is used to initiate the cutting process.

The power source is typically supplied with operational feedback from the torch and a processor, disposed in the power source, interprets the data and controls the operation of the power source and the plasma cutting process accordingly. For example, the processor in the power source is provided with feedback about the position of the torch trigger and whether all necessary torch components are securely in place at the torch. From the feedback, the processor determines whether to initiate cutting, pause cutting, discontinue cutting, or augment the operation of the plasma cutter during cutting.

This feedback is typically provided via dedicated communications lines. Therefore, for each form of feedback that is sent from the torch to the power source, an individual communications line is connected between the power supply and cutting torch. Therefore, a parallel communications system is utilized to send feedback from the cutting torch to the power source whereby a processor disposed within the power source controls the operation of the plasma cutter accordingly. However, this system presents numerous drawbacks.

First, plasma cutting is a high voltage process and therefore the user must be mindful that precautionary measures must be taken to avoid improper operation. As such, it is necessary to determine whether specific conditions are present prior to the initiation of cutting. For example, before the power source responds to a request for operational power at the torch, the processor of the power source typically determines whether a retaining cup, fastened at the torch tip and securing the electrode, is in place. This ensures that the torch is in operating condition prior to cutting. However, while it is common to provide a cup-attached signal before permitting operational cutting, additional feedback is limited by the number of communication links between the feedback system located in the torch and the processing unit located in the power source. Specifically, since the feedback must be sent from the torch to the processor located in the power source, the feedback must travel over a lengthy cable connecting the torch and the power source. To control manufacturing costs and maintain portability of the plasma cutter, it is desirable to limit the number of communications links from the feedback system of the torch to the power source. As such, though additional sensors could be included to provide additional feedback regarding the plasma cutting process, the number of sensors to provide feedback is limited by the number of communications links.

Second, such systems are dependent upon the power source for operational control. That is, though operational feedback is gathered at the torch, the torch is dependent upon the power source for all processing and control commands. As a result of this dependency, when replacements or upgrades to the control system are desired, it is necessary to replace the power source, and often necessary to replace both the power source and the torch. Therefore, incremental upgrades are generally cost prohibitive.

It would therefore be desirable to design a plasma cutting system that is capable of controlling a plasma cutting process with increasing portability and interchangeability. It would also be desirable for the plasma cutting system to be incrementally upgradeable. Specifically, it would be desirable to design a plasma cutting system having localized feedback and control.

BRIEF DESCRIPTION OF INVENTION

The present invention is directed to a system and method of coordinating operational feedback in a plasma cutter that overcomes the aforementioned drawbacks. Specifically, the present invention provides a system and method to localize feedback and control of a plasma cutting system such that communication links throughout the plasma cutting system are reduced, response time to feedback is increased, and intercomponent dependencies are reduced.

Therefore, in accordance with one aspect of the present invention, a plasma cutting system is disclosed that includes a plasma cutting power source and a plasma torch operationally connected to the plasma cutting power source. A processing unit is disposed within the plasma torch and is configured to control the plasma cutting power source during a plasma-cutting process.

In accordance with another aspect of the present invention, a controller disposed within a plasma cutting torch is disclosed wherein the controller is configured to receive operational feedback regarding a plasma cutting process and process the operational feedback. The controller is configured to transmit a control signal to a plasma cutting power source, the control signal having at least one control command that when processed by the plasma cutting power source causes a change in operation of the plasma cutting power source.

In accordance with yet another aspect of the present invention, a plasma cutting torch assembly is disclosed that includes a torch body enclosing a plasma-cutting electrode and a plurality of sensors disposed within the torch body, and configured to provide operational feedback regarding a plasma cutter. A processing unit is disposed within the torch body to receive feedback from the plurality of sensors and is configured to control a plasma cutting process according to the feedback.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to an localized control system for a plasma cutter. Specifically, the present invention provides a system and method of to localize a feedback and control system of a plasma cutting system such that communication links throughout the plasma cutting system are reduced, response time to feedback is increased, and inter-component dependencies are reduced.

Figure 1:
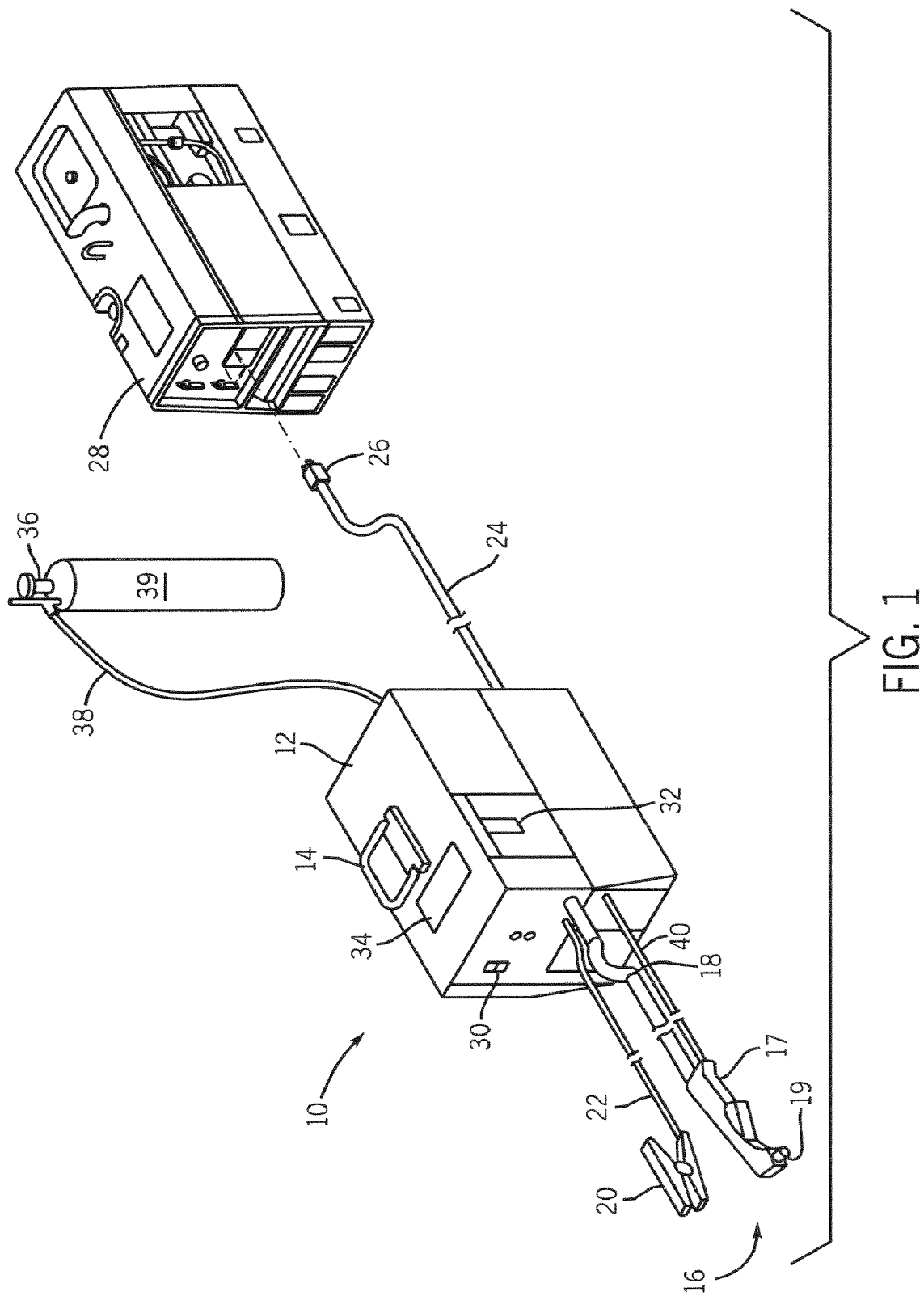
FIG. 1 is a perspective view of a plasma cutting system incorporating the present invention.

Referring to FIG. 1, a plasma cutting system 10 is shown. The plasma cutting system is a high voltage system with maximum open circuit output voltages ranging from approximately 230 Volts Direct Current (VDC) to over 300 VDC. The plasma cutting system 10 includes a power source 12 to condition raw power and regulate/control the cutting process. Specifically, the power source includes a processor that, as will be described, receives operational feedback and controls the plasma cutting system 10 accordingly. Power source 12 includes a lifting means handle 14 which effectuates transportation from one site to another. Connected to the power source 12 is a torch 16 via cable 18. The torch 16 is defined at least by a torch body or housing 17 enclosing a plasma-cutting electrode 19. Typically, the plasma-cutting electrode tip 19 has an insert formed therein that exhibits preferable electrical properties. That is, the insert is preferably formed of hafnium or zirconium. Enclosing the tip of the plasma-cutting electrode is a nozzle 46. The cable 18 provides the torch 16 with power and serves as a communications link between the torch 16 and power source 12. The cable 18 contains two conductive paths. One conductive communications link or conductive path is dedicated to the transfer of power to energize the plasma-cutting electrode 19 and the other conductive path is dedicated to the transfer of control commands to the power source 12. In an alternative embodiment, the cable 18 contains one conductive path between the torch 16 and power source 12 to transfer both control commands and power. Specifically, a single conductive path is contained within the cable 18 that simultaneously transfers power and control commands from the plasma torch regarding the plasma cutting process.

Also connected to power source 12 is a work clamp 20 which is designed to hold a workpiece (not shown) to be cut. Connecting work clamp 20 to the power source 12 is a cable 22 designed to provide a return path for the cutting current from the torch through the workpiece and the work clamp 20. Extending from a rear portion of power source 12 is power cable 24 having plug 26 for connecting the power source 12 to a portable power supply 28 or a transmission power receptacle (not shown). Power source 12 further includes an ON/OFF switch 30, latches 32, and a model label 34.

A gas bottle regulator 36 controls a supply of cutting gas delivered to the power source 12 via gas cable 38. A gas bottle 39 contains a supply of cutting gas which is available to the gas bottle regulator 36. As such, the gas bottle regulator 36 controls the supply of cutting gas from the gas bottle 39 to the power source 12. In turn, the power source passes the cutting gas through an internal filter and regulator to control the supply of cutting gas via a gas supply cable 40 to the torch 16 for a plasma cutting process.

Figure 2:
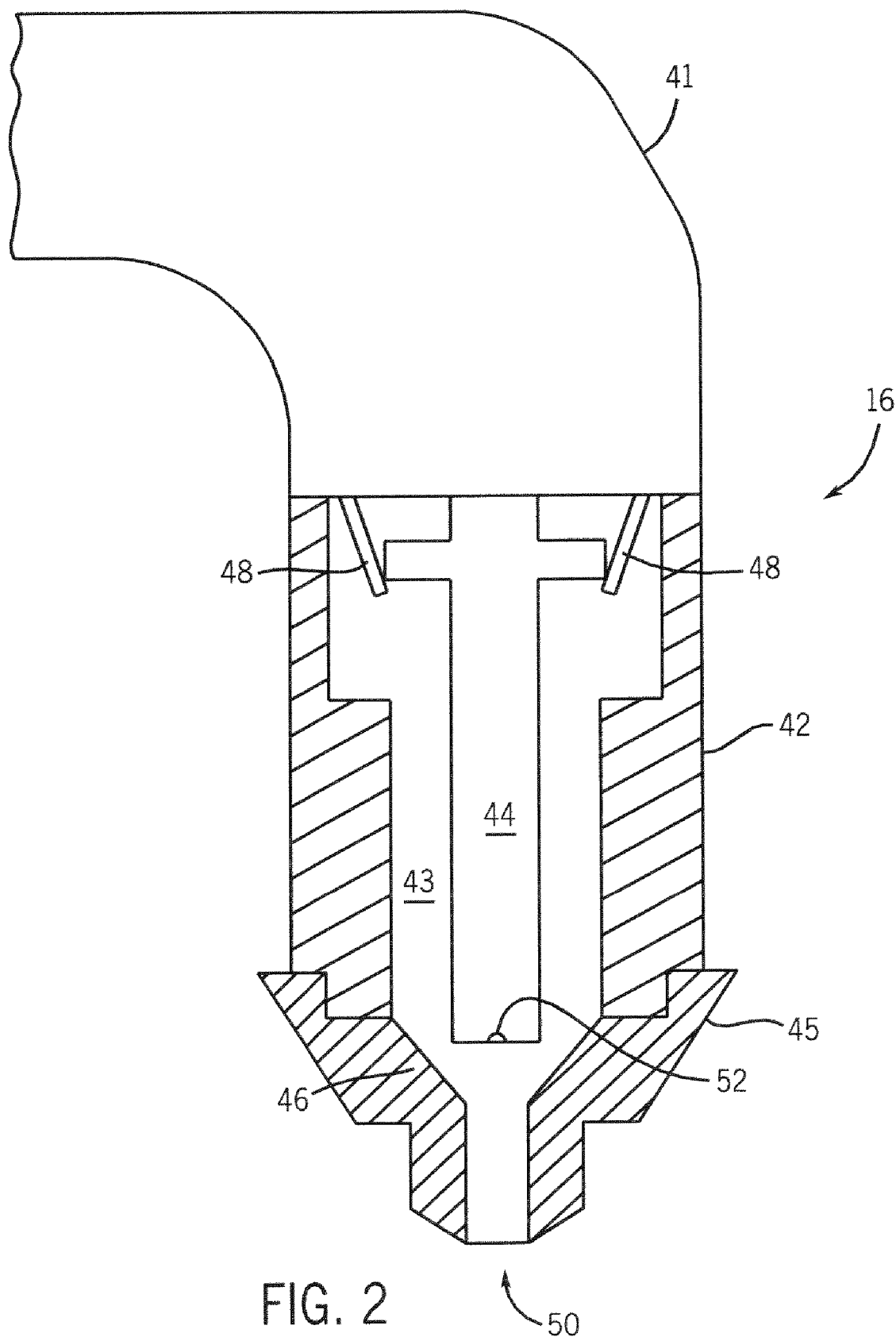
FIG. 2 is a cross-sectional view of a plasma cutting torch in accordance with the present invention.

Referring now to FIG. 2, a cross-section of a plasma cutting torch 16 is shown. Plasma torch 16 is defined by a torch body 41 that is designed to receive a shield cup 42. Shield cup 42 is connected to torch body 41 so as to define a gas chamber 43 that, as will be described in greater detail below, allows for the heating and passage of a plasma. Centrally disposed within gas chamber 43 and connected to torch body 41 is consumable or electrode 44. Consumable 44 is removably connected to torch body 41 and is specifically designed for a particular plasma cutting process. That is, torch 16 is constructed such that various consumables may be interchangeably connected depending upon the particulars of a plasma cutting process to be carried out.

Connected to shield cup 42 is tip 45 that is constructed to form a nozzle 46. In operation, gas is injected into chamber 43 via passages 48 and is heated to a plasma. The plasma is then forced out of the chamber through nozzle 46 and out of the tip 45 via opening or aperture 50. Nozzle 46 is designed to focus the velocity as well as the heat of an arc that is created between a workpiece (not shown) and consumable 44. Consumable 44 is constructed such that the arc extends across an arc path 52 out of the consumable through opening 50.

Referring again to FIG. 1, to effectuate cutting of a workpiece, torch 16 is placed in close proximity to a workpiece. A user may then raise a trigger lock (not shown), in response to which a feedback signal is sent from a trigger sensor disposed within the torch 16 and connected to the trigger lock in the torch 16. The signal is received by a processing unit disposed within the torch 16.

After the trigger lock is removed, the user may then press the trigger switch (not shown). Upon pressing the trigger switch, another feedback signal is sent from the trigger sensor disposed within the torch 16. The trigger switch feedback is again sent to the processing unit. The processing unit receives the signal, interprets the signal, and sends a control command to the power source 12, via the cable 18, where a control disposed in the power source 12, operates in accordance with the control command. Specifically, in response to the trigger lock signal and a trigger switch signal, the processing unit interprets the feedback to signal a request to commence a plasma-cutting process and sends a control command to the control of the power source instructing the power source to deliver the necessary power to the torch 16 to effectuate a pilot arc.

A control signal causes the power source 12 to control the supply of cutting gas from the power source 12, through the gas supply cable 40, and to the torch 16. That is, gas is supplied from the gas bottle 39 or air compressor to the power source 12 whereupon dynamic control signals provided from the processing unit in the torch 16 and interpreted by the power source 12 controls the flow of gas to the torch 16. The gas is then introduced to a gas chamber or volume in the plasma torch 16 whereupon the gas is heated to a plasma state, as is well-known. Specifically, when the cutting gas arrives at the electrode 19 of the torch 16 the pilot arc current generated by the supply of power from the power source 12 through the electrode 19 causes the cutting gas to enter the plasma state. The cutting gas is then passed under force at a high speed toward the workpiece. The high speed plasma cuts through the workpiece which is made molten by the transfer of power from the tip of the cutting electrode 17 to the clamp 20 via the workpiece. Beyond effectuating the cutting of the workpiece, the cutting gas is also directed around the perimeter of the cutting area to shield the cut. As such, a plasma cutting process is initiated in response to control commands sent by the processing unit disposed within the torch 16.

Beyond the trigger lock and trigger depression sensors, additional sensors may be included within the torch 16 to send additional feedback, specific to plasma cutting, to the processing unit of the torch 16. For instance, sensors to monitor air pressure, tip and electrode type, safety trigger, and consumable life may be included. Other additional sensors to provide feedback regarding a plurality of plasma cutting operations may also be included. For example, sensors may be constructed and disposed within the torch 16 to send feedback regarding cup position, shorted component, torch temperature, trigger position, operation amperage, current transfer, and voltage drop, as well as any other operational conditions capable of being monitored. Specifically, a wide range of feedback may be monitored to control the plasma cutting process without encumbering the plasma cutting system with an extensive feedback and communication system because the feedback and processing systems are localized in the torch 16. That is, because the feedback need only be transmitted a short distance within the torch 16 to the processing unit, a plurality of feedback may be received without the need for additional support for transmitting the plurality of feedback over large distances, such as back to the power source 12. All feedback signals generated remain in the torch 16 because they are sent from a sensor within the torch 16 to the processing unit within the torch 16. Therefore, even though multiple feedback signals are sent, received, and interpreted, complex transmission systems to send the feedback from the torch 16 are not necessary because the process is localized within the torch 16.

Rather than sending the feedback from the sensor disposed within the torch 16 to the power source 12 to be interpreted, all feedback remains within the torch 16 where it is interpreted by the processing unit. Therefore, only control commands from the processing unit in the torch 16 to the power source 12 are sent from the torch 16. The control commands form operational instructions that are implemented by the power source 12. For example, a control command may form an instruction to supply power to the torch 12. The control command may form an instruction to the power source to reduce the supply of cutting gas delivered to the torch 16. In this case, the control command is sent to the power source 12 via cable 18, which thereby effectuates the instruction to reduce or, if applicable, terminate the flow of cutting gas from the power source to the torch 16.

Therefore, the control commands are sent from the torch 16 to the power source 12 via cable 18, which creates communications links between the torch 16 and the power source 12. The cable 38 provides the communication link between the power source 12 and the gas bottle regulator 36, whereby control commands from the torch 16 are relayed from the power source 12 to the gas bottle regulator 36. As such, a single communications line between the torch 16 and the power source 12 is all that is necessary to create the communications system outside the torch because the processing unit of the torch 16 serializes all control command.

Therefore, it is contemplated that the communication from the torch 16 to the power source 12 be via a serial link. In one embodiment the communications links also facilitate the transfer of power from between power source 12 and the torch 16. Accordingly, the communications links serve dual purposes and a single conductive means is included within the cable 18 to transmit power and control commands. Therefore, it is contemplated that a filter to separate information signals from power signals may be employed. However it is also contemplated that the communications could be transmitted to the power source 12 as an analog signal or variable frequency signal via RF, infrared, or other known wireless methods.

Figure 3:
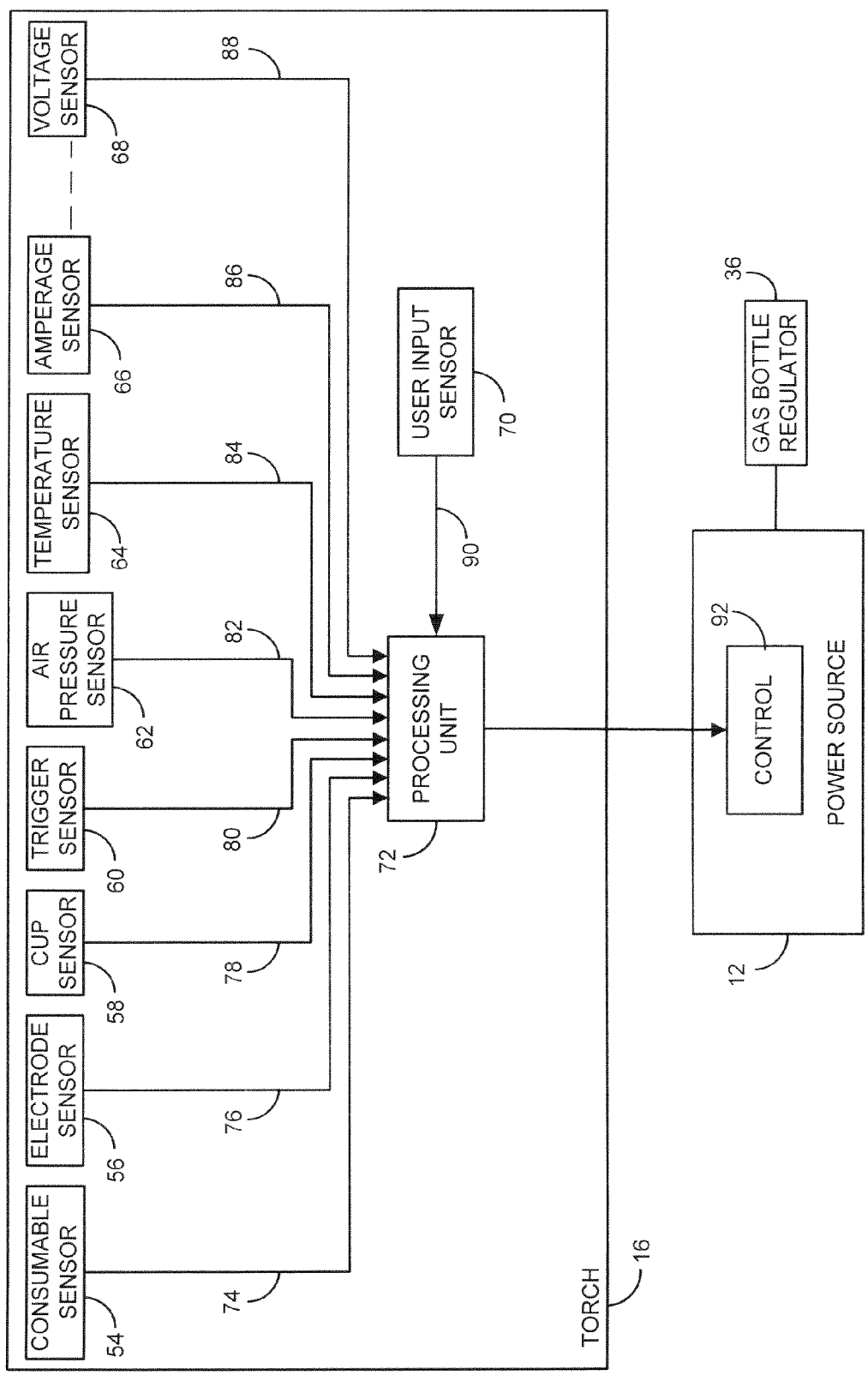
FIG. 3 is a schematic representation of a plasma cutting control system operable with the plasma cutting system shown in FIG. 1.

Referring now to FIG. 3, a schematic representation of the plasma-cutting control system in accordance with the present invention is shown. A plurality of feedback sensors is disposed within plasma torch 16 including a consumable sensor 54, an electrode sensor 56, a cup sensor 58, a trigger sensor 60, an air pressure sensor 62, a temperature sensor 64, an amperage sensor 66, a voltage sensor 68, and user input sensor 70. However, this list of sensors is exemplary and is not exhaustive of those contemplated or applicable. For example, it is contemplated that multiple user input sensors may be provided to receive a start pilot arc command, an adjust amperage command, and an adjust voltage command. This list of user input sensor is also exemplary and is not intended to be exhaustive of those contemplated or applicable. Specifically, it is contemplated that sensors to detect any or all user input associated with a plasma-cutting process may be included in the plasma torch 16. Each sensor 54–70 is connected to transmit feedback sensory information to a processing unit 72, which is also disposed within the plasma torch 16.

The processing unit 72 receives the feedback from the sensors 54–70 across signal paths 74–90 and interprets the feedback to generated control commands. The control commands are then serially transmitted by the processing unit 72 to the power source 12 where the commands are received by control 92. That is, responsive to the feedback received via signal paths 74–90, the processing unit 72 interprets the feedback received and generates a control command.

Therefore, a plasma-cutting control system is created whereby the length of signal paths 74–90 is reduced. Specifically, by placing the processing unit 72 within the torch 16 the distance which feedback from sensors 54–70 has to travel along signal paths 74–90 is greatly reduced as opposed to control systems where the processing unit 72 is located externally from the torch 16.

Accordingly, a plasma-cutting control system is created with an improved response time to a potentially problematic operating condition. That is, because any feedback is sent a short distance within the torch to the processing unit 72, delay between the generation of the feedback by the sensors 54–70 and the receipt of the feedback at the processing unit 72 reduced. Accordingly, the processing unit 72 can determine a potentially problematic operating condition from the feedback and generate a control command to the power source 12 or gas bottle regulator 36 before the potentially problematic operating condition persists.

Furthermore, a plasma-cutting control system is created that increases interchangeability between the torch 16, the power source 12 and the gas bottle regulator 36. That is, the torch 16 may be configured to operate with multiple, different power sources 12 and/or multiple, different gas bottle regulators 36. Specifically, the torch 16 is not dependent upon the configuration of the power source 12 or gas bottle regulator 36 because the torch 16 contains the processing unit 72 that controls the plasma-cutting process. As such, the torch may be configured to be portable and interchangeable between multiple configurations with different power sources and gas bottle regulators.

It is contemplated that the current invention may be embodied in a plasma cutting system that includes a plasma cutting power source and a plasma torch operationally connected to the plasma cutting power source. A processing unit is disposed within the plasma torch and is configured to control the plasma cutting power source during a plasma-cutting process.

It is further contemplated that the current invention may be embodied as a controller disposed within a plasma cutting torch wherein the controller is configured to receive operational feedback regarding a plasma cutting process and process the operational feedback. The controller is configured to transmit a control signal to a plasma cutting power source, the control signal having at least one control command that when processed by the plasma cutting power source causes a change in operation of the plasma cutting power source.

It is also contemplated that the current invention be embodied in a plasma cutting torch assembly that includes a torch body enclosing a plasma-cutting electrode and a plurality of sensors disposed within the torch body and configured to provide operational feedback regarding a plasma cutter. A processing unit is disposed within or mounted independently to the torch body to receive feedback from the plurality of sensors and is configured to control a plasma cutting process according to the feedback.

The present invention has been described in terms of the preferred embodiment, and it is recognized that equivalents, alternatives, and modifications, aside from those expressly stated, are possible and within the scope of the appending claims.

What is claimed is:

1. A plasma cutting system comprising:
   a plasma cutting power source;
   a plasma torch operationally connected to the plasma cutting power source; and
   a processing unit for controlling the plasma cutting power source, the processing unit disposed within the plasma torch to reduce signal path length and thereby provide reduced feedback delay time during a plasma cutting process.

2. The plasma cutting system of claim 1 wherein the processing unit is further configured to receive data from a plurality of sensors disposed within the plasma torch.

3. The plasma cutting system of claim 2 wherein the processing unit is further configured to interpret feedback from the plurality of sensors and regulate operation of the plasma cutting power source according to the feedback.

4. The plasma cutting system of claim 1 wherein the plasma torch is connected to the plasma cutting power source via a communications link such that the processing unit is in communication with the plasma cutting power source.

5. The plasma cutting system of claim 4 wherein the communications link at least supplies power to the plasma torch.

6. The plasma cutting system of claim 4 wherein the processing unit is further configured to serialize communication with the plasma cutting power source.

7. The plasma cutting system of claim 1 wherein the processing unit is further configured to receive control data from at least one user input and control the plasma cutting process according to the user input.

8. The plasma cutting system of claim 7 wherein the user input is one of at least a start pilot arc command and an adjust amperage control.

9. The plasma cutting system of claim 1 wherein the plasma torch is configured to perform the plasma cutting process with a maximum open circuit output voltage of greater than 220 volts DC.

10. The plasma cutting system of claim 1 wherein the plasma cutting power source includes at least one controller configured to adjust a power output based on at least control signals from the plasma torch processing unit.

11. The plasma cutting system of claim 1 wherein the processing unit is configured to control the plasma cutting power source by changing more than one operating parameter of the plasma cutting process.

12. A controller disposed within a plasma cutting torch, the controller configured to:
   receive operational feedback regarding a plasma cutting process in the plasma cutting torch through at least one reduced signal path and thereby reduce delay time;
   process the operational feedback in the plasma cutting torch;
   transmit a control signal from the plasma cutting torch to a plasma cutting power source, the control signal having at least one control command that when processed by the plasma cutting power source causes a change in operation of the plasma cutting power source.

13. The controller of claim 12 configured to receive the operational feedback from a plurality of feedback sensors, wherein the feedback sensors include at least one operational feedback sensor and at least one user input sensor.

14. The controller of claim 13 wherein the at least one operational feedback sensor includes at least one of a power source activation indicator, an electrode type indicator, a tip type indicator, a cup position indicator, a consumable indicator, a shorted component indicator, an air pressure indicator, a temperature indicator, a trigger position indicator, a trigger safety indicator, an operation amperage indicator, a current transfer indicator, and a voltage drop indicator.

15. The controller of claim 13 wherein the plurality of feedback sensors is disposed within the plasma cutting torch.

16. The controller of claim 13 wherein the user-input is one of at least a start pilot arc command and an adjust amperage control.

17. The controller of claim 12 wherein the plasma cutting torch is configured to be operable with multiple plasma cutting power sources.

18. A plasma cutting torch assembly comprising:
   a torch body enclosing a plasma-cutting electrode;
   a plurality of sensors disposed within the torch body and configured to provide operational feedback regarding an in-operation plasma cutter; and
   a processing unit disposed within the torch body to receive feedback from the plurality of sensors and configured to control a plasma cutting process according to the feedback, wherein at least one feedback path from the sensors to the processing unit is reduced to improve response time.

19. The plasma torch assembly of claim 18 wherein the plurality of feedback sensors includes at least one user input sensor, a power source activation sensor, an electrode type indicator, a tip type indicator, a cup position indicator, a consumable indicator, a shorted component indicator, an air pressure indicator, a temperature indicator, a trigger position indicator, a trigger safety indicatory, an operation amperage indicator, a current transfer indicator, and a voltage drop indicator.

20. The plasma torch assembly of claim 18 wherein the processing unit disposed within the torch body is further configured to control starting the plasma cutting process.

21. The plasma torch assembly of claim 18 wherein the processing unit is further configured to serialize control commands that when processed by a plasma cutting power source causes a change in the plasma cutting process.

22. The plasma torch assembly of claim 18 wherein the processing unit controls the plasma cutting process by sending control commands to a plasma cutting power source.

* * * * *